(12) United States Patent
Boone et al.

(10) Patent No.: US 11,843,234 B2
(45) Date of Patent: Dec. 12, 2023

(54) RETENTION DEVICE, SYSTEM AND METHOD FOR HOLDING ONE OR MORE CABLES AND USE THEREOF

(71) Applicant: Roxtec AB, Karlskrona (SE)

(72) Inventors: Dennis Boone, Tulsa, OK (US); Diana Richards, Tulsa, OK (US)

(73) Assignee: Roxtec AB, Karlskrona (SE)

( * ) Notice: Subject to any disclaimer, the term of this patent is extended or adjusted under 35 U.S.C. 154(b) by 0 days.

(21) Appl. No.: 17/736,450

(22) Filed: May 4, 2022

(65) Prior Publication Data
US 2022/0368118 A1 Nov. 17, 2022

Related U.S. Application Data

(60) Provisional application No. 63/186,951, filed on May 11, 2021.

(51) Int. Cl.
*H02G 3/04* (2006.01)
*H02G 3/22* (2006.01)

(52) U.S. Cl.
CPC .......... *H02G 3/0487* (2013.01); *H02G 3/22* (2013.01)

(58) Field of Classification Search
None
See application file for complete search history.

(56) References Cited

U.S. PATENT DOCUMENTS

| | | | | |
|---|---|---|---|---|
| 1,986,965 A * | 1/1935 | Harrison | .............. | H02G 3/0608 191/23 R |
| 1,992,574 A * | 2/1935 | Jenkins | ................ | H02G 3/0608 191/23 R |
| 3,504,097 A * | 3/1970 | Carlson | .................. | H02G 9/065 174/68.3 |
| 3,803,343 A * | 4/1974 | Carlson | .................... | H02G 5/06 174/68.2 |
| 6,521,840 B1 * | 2/2003 | Kreutz | ..................... | H02G 3/22 138/109 |
| 2007/0199728 A1 * | 8/2007 | Hedstrom | ................. | F16L 5/08 174/50.5 |
| 2009/0194644 A1 * | 8/2009 | Lundborg | ................. | F16L 5/14 248/49 |
| 2009/0218451 A1 * | 9/2009 | Lundborg | .............. | H02G 11/00 248/65 |
| 2012/0073872 A1 * | 3/2012 | Hildingsson | ............. | H02G 3/22 174/362 |
| 2013/0161067 A1 * | 6/2013 | Filatov | ................. | B65H 75/366 29/428 |
| 2020/0256484 A1 * | 8/2020 | Erlingsson | ........... | H02G 3/0456 |

* cited by examiner

*Primary Examiner* — Krystal Robinson
(74) *Attorney, Agent, or Firm* — Merchant & Gould P.C.

(57) ABSTRACT

The present invention relates to a retention device for holding one or more cables, comprising: a support bracket having at least one end piece with a recess, a back piece, a locking device configured to run through the recess of the support bracket for cooperation with the back piece, and at least one compressible module having a through opening configured to receive one or more cables, wherein the at least one compressible module is arranged between the support bracket and the back piece, and wherein the locking device is configured to lock the end piece of the support bracket to the back piece and compress the at least one compressible module around the one or more cables. Disclosed is also a retention system comprising such a device, a method for holding one or more cables and use of said system.

21 Claims, 7 Drawing Sheets

RETENTION DEVICE, SYSTEM AND METHOD FOR HOLDING ONE OR MORE CABLES AND USE THEREOF

CROSS-REFERENCE TO RELATED-APPLICATION(S)

This application claims priority benefit of U.S. Provisional Patent Application No. 63/186,951, filed May 11, 2021, and which application is hereby incorporated by reference in its entirety. To the extent appropriate, a claim of priority is made to the above-disclosed application.

TECHNICAL FIELD

The present invention is related to a retention device for holding one or more cables. Such retention devices are generally used for holding cables in place and are often used in connection with a transit for cables through a partition, such as a floor or a roof of a building or other types of partitions where cables are arranged to run from one side of the partition to the other, such as between floors or from within the building to the rooftop thereof. For example, such retention devices can be used for holding cables being fed up from within a building to a rooftop. Such retention devices may also be used for holding cables in other places, such as cabinets, ducts, shafts or any other suitable place. The present invention is also related to a retention system and a retention method for holding one or more cables. The present invention is also related to the use of such a system.

BACKGROUND

Installing transits for cables on rooftops and other places can be difficult. It is often desirable to provide a proper sealing around the cables and hold them in place in an organized manner. Moreover, it is favorable to simplify the installation process for the operator. A problem with existing solutions is that the cables oftentimes need to be transitioned into other cables or smaller more flexible cables before they can be connected to other equipment in different types of systems. Another problem arises when the cables need to be changed. Thus, there is room for improvements regarding the prior art devices and systems for the retention of cables and for the installation of cable transits, such as on rooftops.

SUMMARY

An object of the present invention is to provide a novel retention device and system which is improved over prior art. This object is achieved by means of the technique set forth in the appended independent claims; preferred embodiments being defined in the related dependent claims.

According to one aspect, a retention device for holding one or more cables is provided. The retention device comprises a support bracket having at least one end piece with a recess, a back piece, a locking device configured to run through the recess of the support bracket for cooperation with the back piece, and at least one compressible module having a through opening configured to receive one or more cables, wherein the at least one compressible module is arranged between the support bracket and the back piece, and wherein the locking device is configured to lock the end piece of the support bracket to the back piece and compress the at least one compressible module around the one or more cables. The retention device according to the present invention results in reliable holding of the cables in a safe and organized manner while providing for easy and efficient installation thereof. The configuration of the support bracket having the end piece with the recess cooperating with the locking device results in that the user may easily compress the compression modules holding the cables in place and locking the support bracket to the back piece by means of the locking device. The retention device holds the weight of the cable(s) and supports the load thereof. For example, the retention device maintains the weight of one or more cable(s) extending at least partially in the vertical direction. For example, the retention device maintains the weight of the cable(s) below the compressible module. In addition, the retention device may reduce or minimize vibrations, both in an axial direction along the cable(s) and in a radial direction, wherein the vibrations are absorbed into the compressible module(s) in the retention device holding the cable(s).

The locking device can be a cam lever locking device, which results in a quick and easy way of pressing the support bracket toward the back piece while simultaneously compressing the compressible modules. Alternatively, the locking device can be a screw or a bolt having a head for pressing the support bracket toward the back piece when tightened. Hence, tightening of the locking device can easily be done with a tool, such as a power tool, for secure tightening.

The support bracket can be arranged with a first end piece and a second end piece, each of which being provided with a recess, so that the first end piece is arranged with a first recess and the second end piece is arranged with a second recess. The end pieces can be arranged at opposite ends of the support bracket and may extend outward in a radial direction, wherein the cable or cables running though the compressible module extend(s) in an axial direction, such as vertically. For example, the end pieces are plates or plate portions extending in a vertical plane, wherein the recess extends from the bottom edge and upward and is accessible from the bottom for receiving a locking device. The retention device can then comprise a first locking device connected to the back piece and cooperating with the first end piece of the support bracket through the first recess, and a second locking device connected to the back piece and cooperating with the second end piece of the support bracket through the second recess to press the support bracket to the back piece and compress the compressible module while locking the support bracket to the back piece. Hence, the retention device can comprise two locking devices. For example, the locking devices are fastened to the back piece, wherein the support bracket can be slid onto the locking devices from above, so that the locking devices are received in the recesses. Both of the locking devices can be screws with a head being accessible by a tool for tightening thereof. Alternatively, at least one of the locking devices is a cam lever locking device to be tightened by hand.

The retention device can be arranged with an elongated opening extending between the two end pieces of the support bracket. Hence, the support bracket can be arranged for receiving a plurality of compressible modules, arranged next to each other, e.g. in a horizontal plane, so that the retention device can receive a plurality of cables in parallel.

The support bracket can be arranged with a bottom lip configured to support the compressible module(s) arranged between the support bracket and the back piece. Hence, the compressible module(s) is/are held in place during mounting thereof and before tightening and locking by means of the locking device(s).

The compressible module has a through opening for a single cable or for a plurality of cables and can be formed by module halves, each having a groove facing the groove of the other to form the through opening. The grooves of the module halves can be arranged with peelable layers of material in order to adapt the through opening to dimensions of the cable, such as the diameter of the cable.

According to a second aspect a retention system for holding one or more cables is provided. The retention system comprises a tubular body and at least one retention device, wherein the tubular body comprises at least one removable panel for accessing the retention device. The retention system can be configured to be mounted on a surface, such as a floor or a rooftop, and can comprise a curved tubular element commonly used as a transit for cables on rooftops and which is also known as a swan neck frame or just a swan neck. Alternatively, the retention system can be mounted in a cabinet, duct or shaft, such as an elevator shaft or mine shaft, or any other suitable places, with or without the swan neck. For example, the retention system is used for holding one or more cables extending at least partially in a vertical direction. The retention system can provide efficient mounting and holding of cables. It can also provide reliable and efficient cable retention for cables being fed to the rooftop from within a building. By providing a cable retention device and system according to the present invention, there is, e.g. no need to transition the cables to smaller more flexible cables to then connect them into further equipment, which simplifies installation. The retention system can comprise conventional swan necks which may be provided with sealing modules required to seal around the associated cables.

The retention system can comprise a plurality of retention devices, such as at least a first retention device and a second retention device, which can be displaced both axially and radially in relation to each other. For example, the second retention device is displaced both vertically and horizontally in relation to the first retention device. For example, the second retention device is arranged below the first retention device and may be arranged closer to the removable panel. Hence, the first retention device can be mounted first, wherein the second retention device can be mounted subsequently, so that the cable(s) of the second retention device is/are drawn in front of and in parallel to the cable(s) of the first retention device.

According to a third aspect a method for holding one or more cables is provided. The method comprises the steps of providing a retention system comprising a tubular body and at least one retention device arranged inside the tubular body, mounting a first end of the tubular body to a surface, arranging a cable in a through opening of a compressible module, arranging the compressible module with the cable in a support bracket of the retention device, fastening the support bracket with the compressible module to a back piece of the retention device by means of a locking device and thereby compressing the compressible module around the cable therein, and attaching a curved tubular element to a second end of the tubular body.

Further characteristics and advantages of the present invention will become apparent from the description of the embodiments below, the appended drawings and the dependent claims.

BRIEF DESCRIPTION OF THE DRAWINGS

By way of example, embodiments of the present invention will now be described with reference to the accompanying drawings, in which.

DETAILED DESCRIPTION

Figure 1:
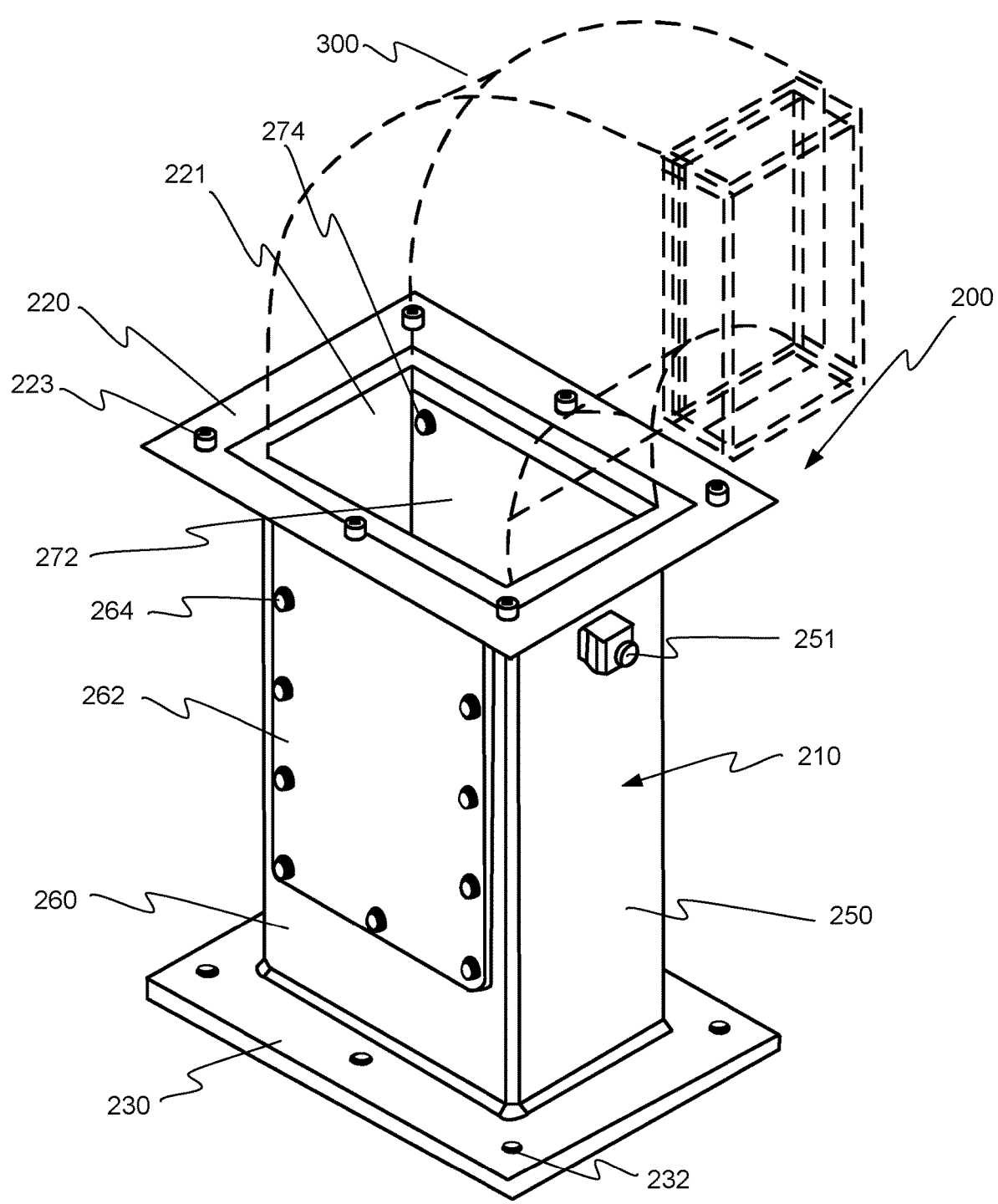
FIG. 1 is a perspective view of a retention system according to one embodiment.
Figures 2, 3:
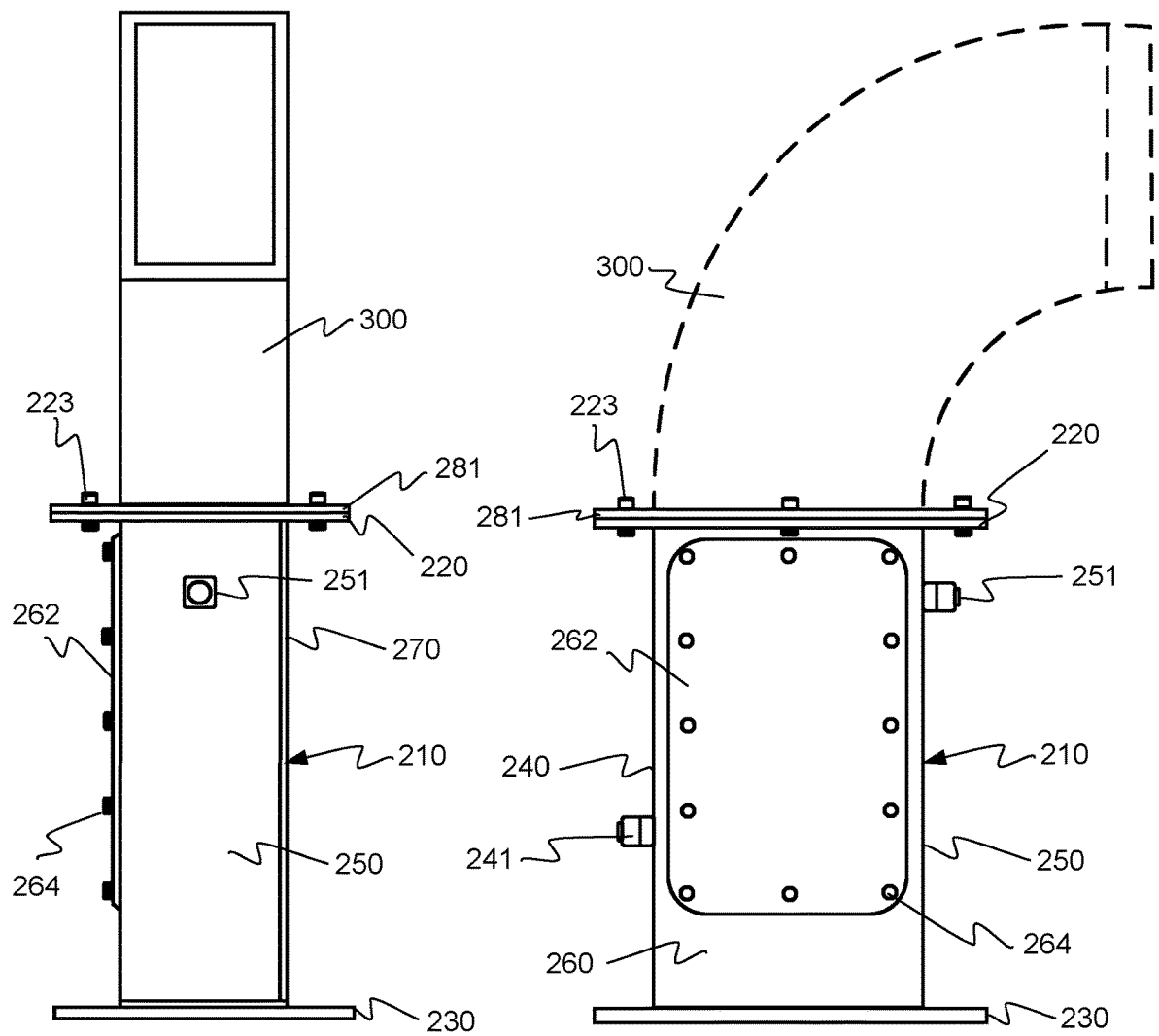
FIG. 2 is a side view of the retention system of FIG. 1.
FIG. 3 is a front view of the retention system of FIG. 1.

With respect to FIGS. 1-3, a retention system 200 is shown. The retention system 200 has a tubular body 210 made up by side walls 240, 250, a front wall 260 and a rear wall 270. The walls are substantially rectangular but may take on other shapes. Moreover, the walls 240, 250, 260, 270 may be removably attachable to one another or integrated with each other in one piece to form the tubular body 210. On respective end portions of the tubular body 210, a first end flange 220 and a second end flange 230 is arranged. For example, the tubular body 210 is rectangular.

The end flanges 220, 230 may be removably attachable to or integrated with the tubular body 210. They resemble frames in that they may have respective rectangularly shaped openings 221 which correspond to the opening of the tubular body 210. The end flanges 220, 230 surround the circumference of the openings of the tubular body 210. For example, the end flanges 220, 230 extend continuously around the circumference of said openings. The opening of the tubular body and the end flanges need not have the same dimensions. The end flanges 220, 230 have holes 232 configured to receive fastening means 223 to enable fastening of the retention system 200 to for instance a curved tubular element 300, often also called a swan neck frame or simply a swan neck (shown in dashed lines in FIG. 1), and a rooftop of a building or other surface (not shown). In FIG. 1, four holes 232 are visible on the bottom end flange 230 with no fastening means present in the holes. On the upper end flange 220, the holes are covered by fastening means 223. It should be noted that the retention system may be fastened to the aimed-at subject or surface in a different way. For instance, the fastening means 223 of the end flanges 220, 230 may be screws, bolts, adhesive, welding joints, etc.

In FIGS. 1-3, the front wall 260 has an opening (opening 261 shown in FIG. 4) covered by a removable panel 262. The removable panel 262 is there to provide access to the inside of the retention system 200. For example, the removable panel is also provided to keep the inner portion of the same free from dust, water, pollution or other things that might have a negative impact on the cables residing in the retention system 200. For instance, the removable panel 262 may be hingedly attachable to the tubular body 210. The opening in the wall is surrounded by holes (not shown) for attaching the removable panel to the wall. Fastening means 264 are provided for attaching the removable panel 262 to the wall 260. The fastening means 264 of the removable panel may for instance be screws or other mechanical fastening elements. For example, at least one of the side walls 240, 250 has an opening covered by a removable panel to provide access to the inside of the tubular body 210. Hence, at least one of the front and side walls 240, 250, 260 has a removable panel providing access to the inside of the retention system 200.

The curved tubular element 300, i.e. the swan neck, is shown in FIGS. 1-3 (in dashed lines in FIGS. 1 and 3) to illustrate a purpose of the retention system 200 of providing a transit for one or more cables through a rooftop or other partition. The swan neck 300 is a hollow element which provides a passage for cables or pipes led through and held in the tubular body 210 of the retention system 200. In a portion, such as an end portion, of the curved tubular element, a space is provided, which is configured to receive a plurality of compressible modules or the like, for sealing around the cables. The retention system 200 acts as an extension between the rooftop of a building and the swan neck 300. As can be seen in FIGS. 1-3, the swan neck is attached to the upper end flange 220 of the retention system 200. According to one embodiment, the swan neck 300 is included in the retention system.

On a side wall 250 of the tubular body 210, an exterior ground lug 251, such as a first exterior ground lug 251, is provided to tie the retention system 200 to building ground.

The same retention system 200 as described in relation to FIG. 1 is seen from a side view and a front view in FIGS. 2 and 3, respectively. In FIG. 3, another exterior ground lug 241, such as a second exterior ground lug 241, is provided, which is configured to tie the retention system 200 to building ground.

Figure 4:
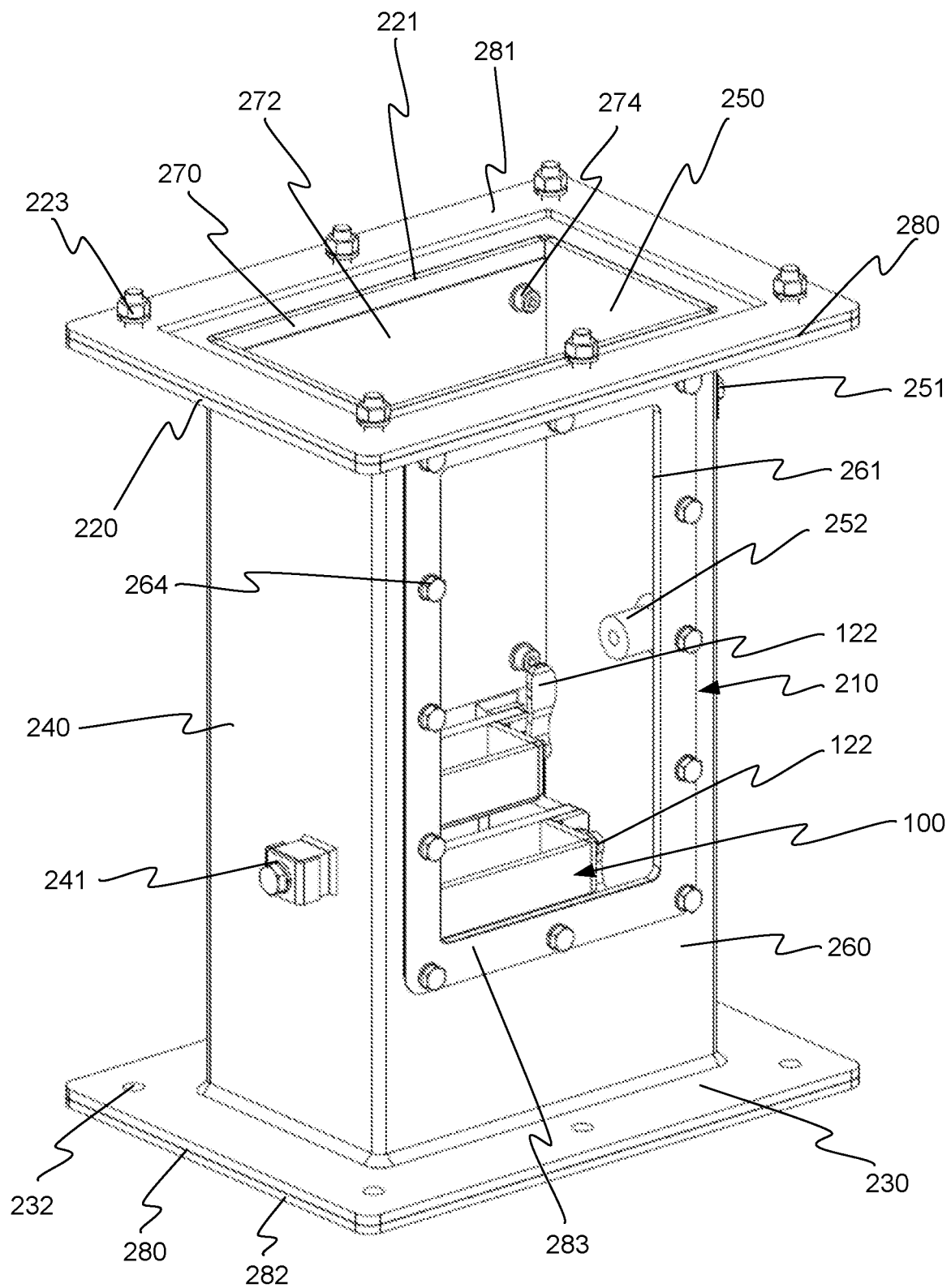
FIG. 4 is a perspective view of a part of the retention system of FIG. 1 displaying an inner portion of the same.

In FIG. 4, a part of the retention system 200 as described in relation to FIGS. 1-3 is shown from a perspective view. Here, the upper end flange 220 is provided with a gasket 281. For example, the gasket 281, includes sealing material, intumescent material, adhesive material and/or conductive material. For example, the gasket 281 is a conductive gasket. For example, the gasket 281 is arranged to provide RF-shielding, EMI shielding, grounding or bonding. For example, the gasket is self-adhesive. In the illustrated embodiment, the gasket 281 is arranged on a self-adhesive element 280 on an upper side of the end flange 220 facing a part to be extended from a rooftop, such as the curved tubular element 300. Fastening means 223 are running through holes (not shown) provided in both the sealing material and the end flange 220. In practice, these fastening means 223 run through a matching end flange (indicated in dashed lines in FIG. 1) of the previously mentioned swan neck. Holes 232 for attaching the bottom end flange 230 to a roof of a building are provided. A gasket 282, e.g. similar to the gasket 281 described above, is arranged between the end flange 230 and the rooftop, e.g. on a self-adhesive element 280.

The inside of the tubular body 210 is exposed via the opening 261 in the front wall 260. A plurality of fastening means 264 run through holes (not shown) provided in both the front wall 260 and in a gasket 283 surrounding the opening 261 of the same. As can be seen through the opening 261 in the front wall 260 in FIG. 4, two retention devices 100 are mounted inside the tubular body 210. In reality, there may be either one or more retention devices 100 arranged in the retention system 200 at once. These retention devices 100 will be described in detail in relation to FIGS. 6-7 below. The purpose of the retention devices is to hold one or more cables running through the retention system 200 in place as well as provide a way for easy installation of and access to cables when needed. The removable panel 262 of the front wall 260 and/or the side walls 240, 250 is/are detachable to enable simple access to the inside of the tubular body 210.

Moreover, an interior ground lug 252 is attached to an inside of the side wall 250 of the tubular body 210 to tie the retention system 200 to building ground.

Figure 10:
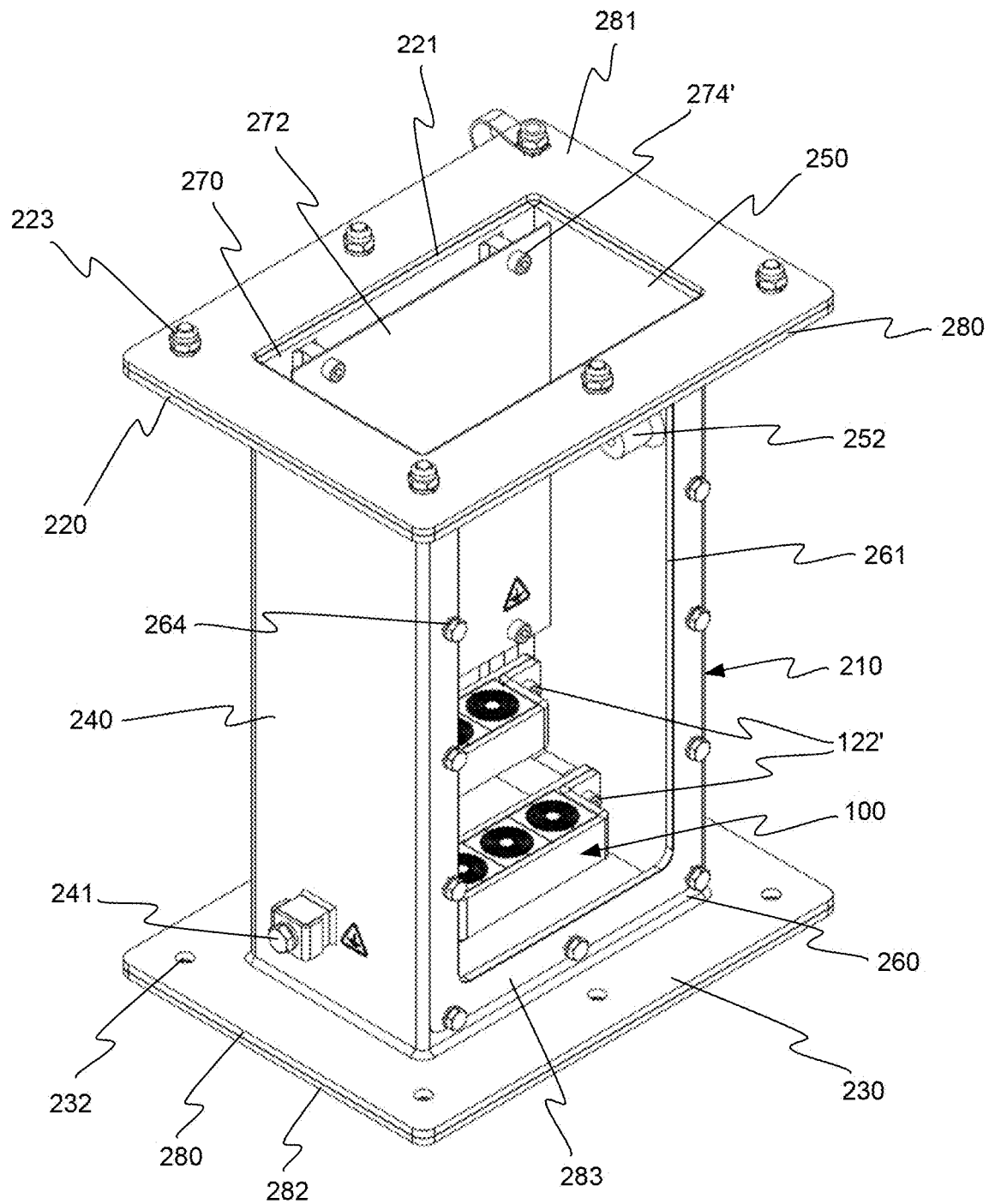
FIG. 10 is a perspective view of a part of the retention system of FIG. 1 displaying an inner portion of the same according to another embodiment.

On the rear wall 270 of the tubular body 210 shown in FIG. 4, a removable attachment plate 272 is arranged. The attachment plate 272 is fastened via fastening means 274 of which only two are shown in FIG. 4. In practice, there may be more than two fastening means 274 for holding the attachment plate 272 in place. Optionally, there is no attachment plate 272 on the rear wall 270. For example, the attachment plate 272 is arranged with a distance to the rear wall 270, as illustrated in FIG. 10. According to one embodiment, the attachment plate 272 is not electrically isolated.

Figure 5:
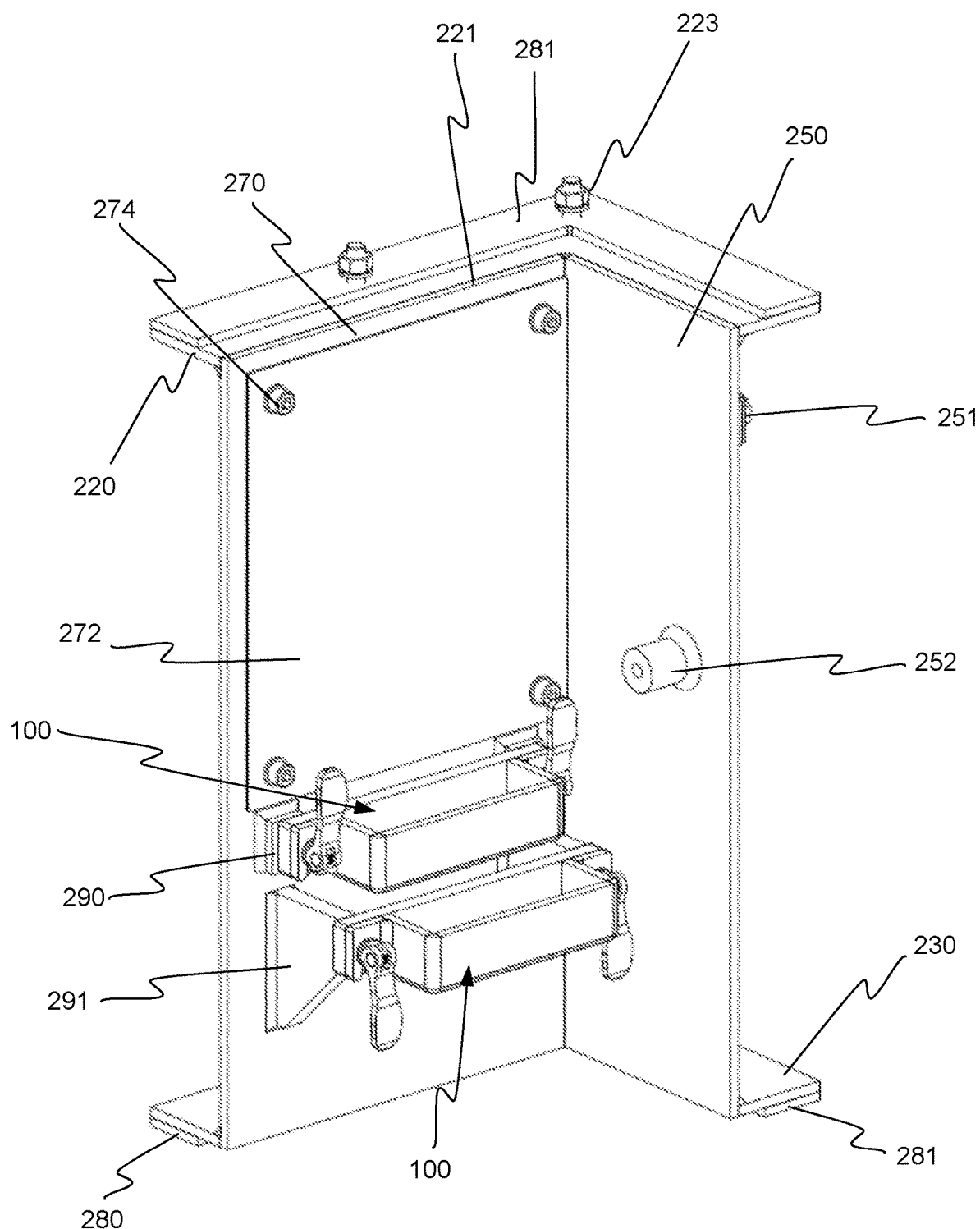
FIG. 5 is a perspective view of a part of the retention system of FIG. 1 displaying an inner portion of the same.

In FIG. 5, the same features described in relation to FIG. 4 are shown, except from that the front wall 260 and the side wall 240 are removed. This is to further illustrate how the inside of the tubular body 210 may look like. As can be seen, the retention devices 100 are mounted to the rear wall 270 via mounting brackets 290, 291. The mounting brackets 290, 291 have different sizes to provide space for the cables when mounted in their respective retention device 100. In FIGS. 4 and 5, the mounting brackets 290, 291 are mounted on the rear wall 270 and are spaced apart and offset to each other along a longitudinal direction of the tubular body 210, which is the same as a longitudinal direction of a wall of the tubular body. Optionally, the mounting brackets are mounted on the side walls 240, 250 of the tubular body 210 as well as the retention devices 100 configured to be attached thereto. The mounting brackets 290, 291 may be either fixedly attached to the associated wall(s) or removably attached. Hence, in the illustrated embodiment the retention system 200 comprises first and second retention devices 100, wherein one is arranged below the other and one is arranged closer to the front wall and its removable panel than the other.

Figure 6:
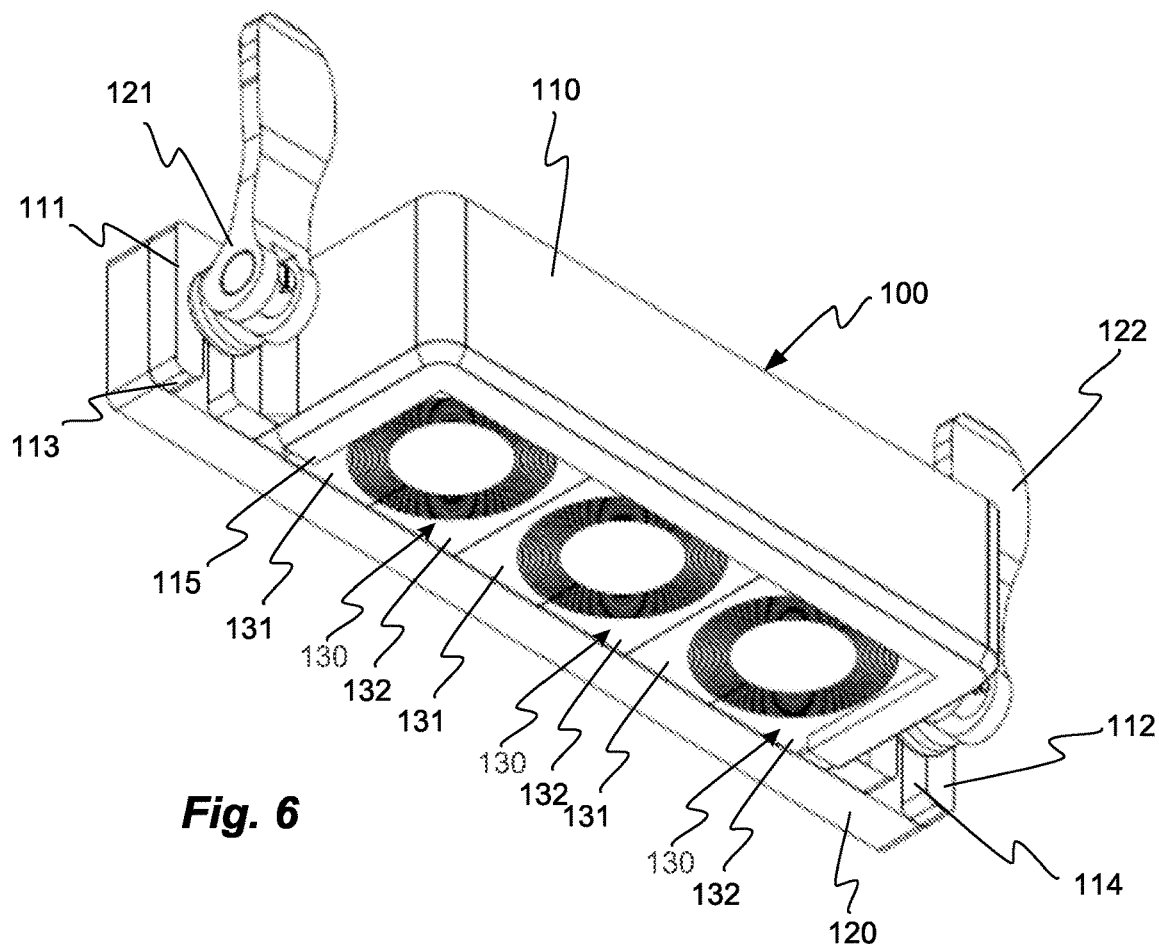
FIG. 6 is a perspective view from below of a retention device according to one embodiment.
Figure 7:
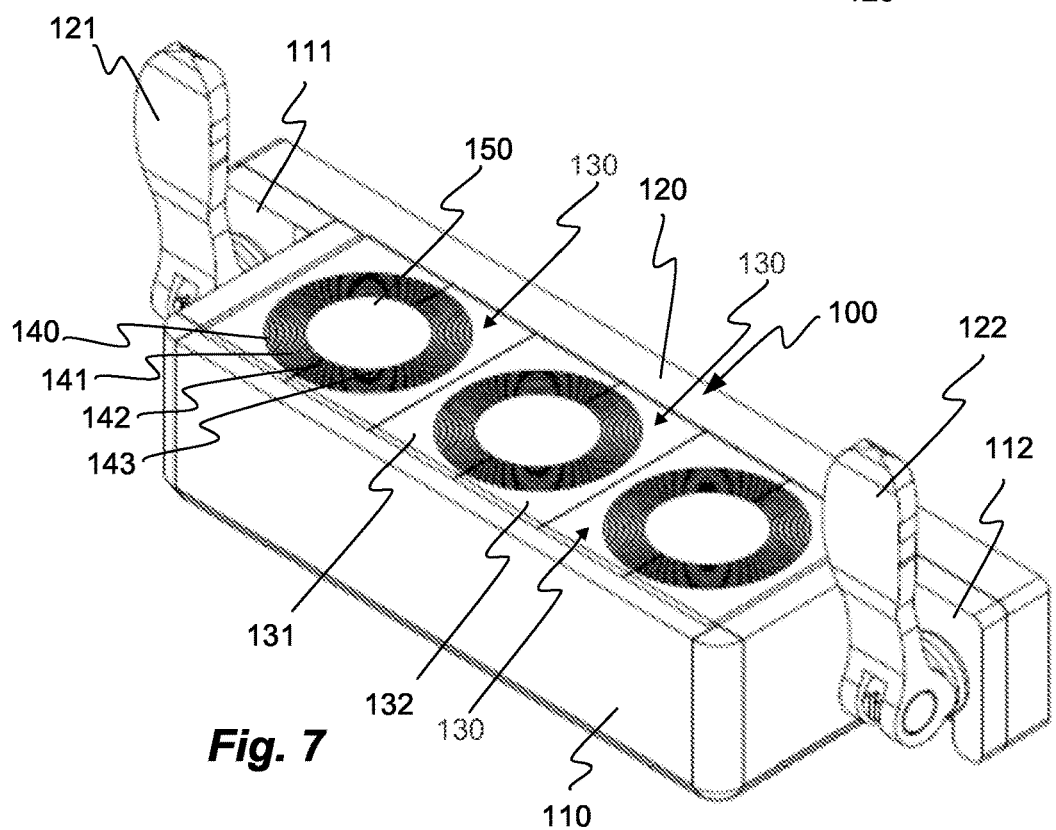
FIG. 7 is a perspective view from above of the retention device of FIG. 6.

Turning to FIGS. 6 and 7, the retention device 100 previously shown in FIGS. 4 and 5 is shown from a bottom and top perspective, respectively. The retention device 100 has a support bracket 110 with two end pieces 111, 112. Each one of the end pieces of the support bracket 110 has a corresponding recess 113, 114 in which a locking device 121, 122 is to be run or slid. The retention device 100 further has a back piece 120. When mounted, the support bracket 110 is forced against the back piece 120 by means of the locking devices 121, 122. For instance, the locking devices 121, 122 are cam lever locking devices. However, other types of locking devices may be used as well, as long as they are able to tighten or press the support bracket 110 against the back piece 120 and lock it in the tightened position. Alternatively, the locking device 121, 122 may be a screw or a bolt for tightening the support bracket 110 against the back piece 120. For example, the support bracket 110 comprises a first plate portion connected in each end to side plate portions extending perpendicular to the first plate portion, wherein the side plate portions are connected to the end pieces 111, 112, and wherein the end pieces extend in parallel to the first plate portion. Hence, the end pieces extend in a plane parallel to a plane of the first plate portion, wherein the side plate portions extend between the first plate portion and the end pieces 111, 112. Alternatively, the support bracket 110 comprises a single end piece 111 for cooperation with a single locking device 121 (which may be rotated between a position to run through the recess and a position for cooperation with the end piece), wherein the opposite end may be attached to the back piece 120 by a hinge (where the hinge may comprise a spigot sliding in a casing in the vertical direction) or similar.

The retention device 100 is configured to retain at least one cable or pipe. It may do so by holding one or more compressible modules 130. Preferably, the retention device 100 is arranged for holding a plurality of modules. In both FIGS. 6 and 7, a plurality of compressible modules 130 is arranged along the length of the retention device 100. The modules 130 are formed of two module halves 131, 132, each having a groove, such as a semi cylindrical groove, on one side thereof. A plurality of peelable layers 140, 141, 142, 143 etc. are arranged on top of each other in said groove. The peelable layers 140, 141, 142, 143 etc. are configured to be removed to adapt an inner diameter of the module 130 to the outer diameter of a cable, wire or pipe to be received in the module 130.

During mounting of the compressible modules 130 in the retention device 100, two module halves 131, 132 are put together with their respective grooves facing each other. Together, the module halves 131, 132 form the module 130, which has a central through opening 150, in which a cable or pipe is to be received. For example, the opening is cylindrical. Thus, when a module 130 is to receive a cable or a pipe, a number of layers 140, 141, 142, 143 etc. are peeled off as required. When the pipes and/or cables have been placed in a module 130 each, the support bracket 110 and back piece 120, which together enclose the modules 130 as seen in FIGS. 6 and 7, are tightened towards one another by means of the locking devices 121, 122. By tightening the locking devices 121, 122, the compressible modules 130 are compressed in one direction in the retention device 100, whereas they expand in other directions between the support bracket 110 and the back piece 120. All in all, the tightening of the locking devices 121, 122 leads to the compression of the modules 130 against the retention device 100 and the cables or wires or pipes. For instance, the compressible modules 130 are made of rubber or compressible plastic materials.

As can be seen in FIG. 6 in particular, the support bracket 110 has a bottom lip 115 configured to hold the compressible modules 130 in place. This way, the operator or user mounting the modules 130 in the support bracket 110 need not worry that the modules are inserted too far into the elongated opening of the support bracket 110 or fall through said opening. For example, the bottom lip 115 is dimensioned such that the largest diameter of cables or pipes can be led through the compressible modules 130 without interfering with the bottom lip 115. For example, the bottom lip 115 extends in a radial direction, such as in a horizontal plane. Hence, the bottom lip 115 is arranged to support a bottom portion of the compressible module or modules 130. For example, the bottom lip 115 extends along an inner bottom end portion of the support bracket 110, such as continuously along the entire inner bottom end portion of the support bracket 110.

Figure 8:
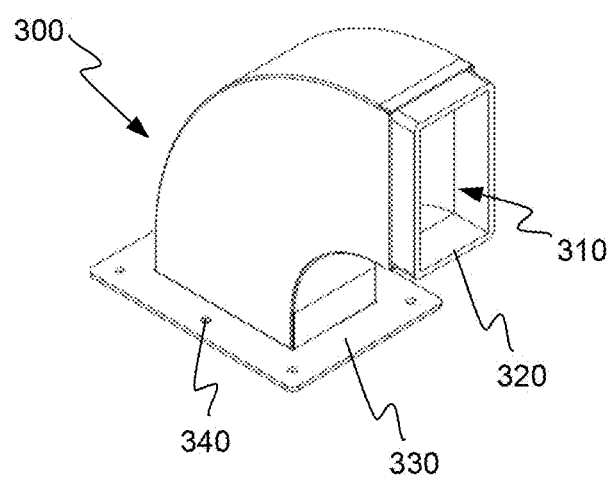
FIG. 8 is a schematic perspective view of a curved tubular element according to one embodiment.
Figure 9:
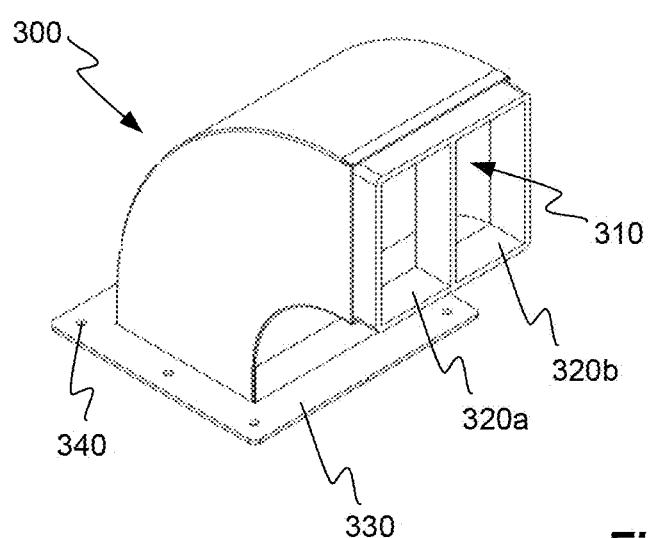
FIG. 9 is a schematic perspective view of a curved tubular element according to another embodiment.

With reference to FIGS. 8 and 9 different embodiments of the curved tubular element 300, i.e. the swan neck, are illustrated. The swan neck 300 is a lead-through for one or more cables as described above. The swan neck 300 has at least one entry opening 310 for receiving cables. The entry opening 310 is arranged for receiving sealing modules, which e.g. may be similar to the compressible modules 130 described above. For example, at a first end, such as a top end, the entry opening 310 of the swan neck 300 comprises a frame 320, such as a substantially rectangular frame, for receiving a plurality of compressible modules and a compression unit, such as a conventional compression unit in the form of a wedge or similar, and optionally stay plates to be arranged between compressible modules or rows thereof. In the embodiment of FIG. 8, the swan neck 300 has a single frame 320 for receiving cables. Alternatively, the swan neck 300 is provided with a plurality of openings frames, such as two, three or more frames 320. In the embodiment of FIG. 9, the swan neck 300 comprises a first frame 320a and a second frame 320b arranged next to each other for receiving sealing modules with cables as described above.

The swan neck 300 is arranged to be attached to the tubular body 210 as described above. In the illustrated embodiment, the swan neck 300 comprises an end flange 330 in a second end, which second end is a bottom end and is opposite the first end with the frame 320. The end flange 330 is arranged for attachment to the first end flange 220 of the tubular body 210, for example, by means of screws through holes 340 or by other fastening devices. Optionally, the gasket 281 is arranged between the end flange 330 of the swan neck 300 and the first end flange 220 of the tubular body 210.

The swan neck 300 is curved between the first and second ends, wherein the top first end and the second bottom end are arranged in different planes. Hence, the swan neck 300 is curved between the end flange 330 and the frame 320. For example, the swan neck 300 is curved at least 45 degrees, at least 60 degrees or around 90 degrees, so that the planes of the first and second ends are perpendicular to each other. For example, the bottom second plane and the end flange 330 extend substantially horizontally. Cables arranged in the entry opening 310 generally follows the curve of the swan neck 300, wherein the swan neck 300 efficiently supports the load of cables entering through the compressible modules in the frame 320. It has been found that the load bearing properties of the swan neck 300 in combination with the retention device 100 as described above result in an efficient and reliable retention system for cables.

With respect to FIG. 10, a similar part of the retention system 200 as described in relation to FIG. 4 is shown according to another embodiment. Like numbers refer to like elements. In FIG. 10, the attachment plate 272 is attached to the rear wall 270 by at least one fastening means 274', such as screws or similar detachable fastening means. The attachment plate 272 is arranged at a distance from the rear wall 270, such as by a spacer element, to form a space between the rear wall 270 and the attachment plate 272. Said space is, e.g. arranged for receiving cables, connections, etc.

In the embodiment of FIG. 10 a screw may be used as a locking device 122' for tightening the support bracket 110 against the back piece 120 of the retention device 100 (see FIGS. 6-7). Hence, instead of a cam lever locking device 121, 122 as shown in FIGS. 4-7, the locking device 122' of FIG. 10 is a screw for tightening the support bracket 110 against the back piece 120 (see FIGS. 6-7). The locking device 122' may be fastened by a tool, such as an electric power tool for rotating a thread of the locking device 122' into a corresponding opening of the back piece 120. For example, the locking device 122' comprises a head, such as a conventional polygonal bolt head, to be engaged and operated by said tool in a conventional manner. For example, the locking device 122' is accessible through the front opening 261 by the tool, so that the locking device 122' can be tightened and untightened by the tool through the front opening 261.

In the illustrated embodiment, a removable or breakable protection 242, such as a mesh or similar, is arranged at the bottom of the retention system 200 to prevent components or debris from unintentionally falling through the retention system 200 during mounting or assembly. For example, the protection 242 can be cut prior to cables being drawn through the retention system 200.

The invention claimed is:

1. A retention device for holding one or more cables, comprising:
    a support bracket having at least one end piece with a recess,
    a back piece,
    a locking device configured to run through the recess of the support bracket for cooperation with the back piece, and
    at least one compressible module having a through opening configured to receive one or more cables,
    wherein the at least one compressible module is arranged between the support bracket and the back piece, and wherein the locking device is configured to lock the end piece of the support bracket to the back piece and compress the at least one compressible module around the one or more cables.

2. The retention device according to claim 1, wherein the locking device is connected to the back piece and cooperating with the end piece of the support bracket through the recess to press the support bracket toward the back piece and compress the compressible module.

3. The retention device according to claim 1, comprising a first locking device and a second locking device, wherein the support bracket comprises a first end piece with a first recess, and a second end piece with a second recess, and wherein the first locking device is connected to the back piece and cooperating with the first end piece of the support bracket through the first recess, and the second locking device is connected to the back piece and cooperating with the second end piece of the support bracket through the second recess to press the support bracket to the back piece and compress the compressible module.

4. The retention device according to claim 1, wherein the retention device has an elongated opening extending between the two end pieces of the support bracket.

5. The retention device according to claim 4, wherein the elongated opening is configured to receive a plurality of compressible modules.

6. The retention device according to claim 1, wherein the support bracket has a bottom lip configured to support the at least one compressible module.

7. The retention device according to claim 1, wherein the compressible module is formed by first and second module halves.

8. The retention device according to claim 7, wherein the module halves have peelable layers of material in order to be adaptable to dimensions of the cable.

9. A retention system for holding one or more cables extending in an axial direction, comprising
    a tubular body and at least one retention device according to claim 1 arranged inside the tubular body, wherein the tubular body comprises a removable panel for accessing the retention device.

10. The retention system according to claim 9, comprising a first retention device and a second retention device, wherein the second retention device is displaced both in the axial direction and in a radial direction in relation to the first retention device.

11. The retention system according to claim 9, wherein the tubular body is provided with at least one exterior ground lug and at least one interior ground lug.

12. The retention system according to claim 9, wherein the back piece of the retention device is arranged on the tubular body through a mounting bracket.

13. The retention system according to claim 9, comprising a curved tubular element attached to a top end of the tubular body.

14. The retention system according to claim 13, wherein a gasket is arranged between the tubular body and the curved tubular element, and wherein the gasket comprises a sealing material, an intumescent material, a conductive material and/or an adhesive material.

15. The retention system according to claim 13, wherein the tubular body is provided as an extension between a surface and the curved tubular element.

16. The retention system according to claim 15, wherein the tubular body comprises a rear wall, a front wall and side walls connecting the front and rear walls, wherein at least one retention device is arranged on the rear wall and/or side walls, and wherein the front wall and/or one or more of the side walls comprise(s) a removable panel for accessing the at least one retention device.

17. A method for holding one or more cables, comprising the steps of:
    providing a retention system comprising a tubular body and at least one retention device arranged inside the tubular body,
    mounting a first end of the tubular body to a surface,
    arranging a cable in a through opening of a compressible module,
    arranging the compressible module with the cable in a support bracket of the retention device,
    fastening the support bracket with the compressible module to a back piece of the retention device by means of a locking device and thereby compressing the compressible module around the cable therein, and
    attaching a curved tubular element to a second end of the tubular body.

18. The method of claim 17, comprising the steps of accessing the retention device through a removable panel of the tubular body.

19. The method of claim 17, comprising the step of arranging the locking device in a recess of an end piece of the support bracket and fastening the end piece to the back piece by the locking device while compressing the compressible module between the back piece and the support bracket.

20. The method of claim 17, comprising the step of pressing the support bracket to the back piece by the locking device.

21. The method of claim 17, comprising the step of mounting the first end of the tubular body to a floor or a rooftop.

* * * * *